United States Patent [19]

Steckler

[11] 3,898,525

[45] Aug. 5, 1975

[54] HYSTERESIS VOLTAGE SUPPLY FOR DEFLECTION SYNCHRONIZING WAVEFORM GENERATOR

[75] Inventor: Steven Alan Steckler, Clark, N.J.

[73] Assignee: RCA Corporation, New York, N.Y.

[22] Filed: Aug. 9, 1974

[21] Appl. No.: 496,224

[52] U.S. Cl. .................................. 315/411; 328/311

[51] Int. Cl. ............................................ H01j 29/70

[58] Field of Search ........... 315/411, 479, 380, 386; 328/311, 310, 307

[56] References Cited

UNITED STATES PATENTS 3,688,154 8/1972 Christopher ........................ 315/411

*Primary Examiner*—Maynard R. Wilbur
*Assistant Examiner*—J. M. Potenza
*Attorney, Agent, or Firm*—Eugene M. Whitacre; Paul J. Rasmussen

[57] ABSTRACT

A hysteresis voltage switch is coupled between a direct current supply voltage and a source of deflection synchronizing waveforms. The source of deflection synchronizing waveforms is operable when the supply voltage reaches a minimum amplitude. The switch does not close to couple the deflection synchronizing waveform generator to the supply voltage, however, until the supply voltage is substantially in excess of the minimum amplitude. Cycling off and on of the deflection synchronizing waveform generator as a result of reduction in the supply voltage when the deflection output stages draw current from the supply is thereby prevented.

4 Claims, 3 Drawing Figures

HYSTERESIS VOLTAGE SUPPLY FOR DEFLECTION SYNCHRONIZING WAVEFORM GENERATOR

BACKGROUND OF THE INVENTION

This invention relates to switched voltage supplies for preventing loss of deflection synchronizing waveforms in deflection systems.

The trend toward use of integrated circuits wherever possible in television receivers has required that lower voltage power supplies be provided in the receiver. Use of lower voltage supplies reduces power dissipation on the integrated circuits used. Higher voltage power supplies are still required in the receiver, however, for each applications as the receiver deflection output stages. In order to achieve economy in the design of receiver power supplies, low voltage supplies are frequently derived from the necessary high voltage supplies by utilizing well-known techniques.

A problem may arise where a low voltage supply for an integrated circuit such as a deflection synchronizing waveform generator is derived from the higher voltage supply which provides operating potential to the deflection output stage whose operation it synchronizes. The high currents required by deflection output stages generally require considerable power from their power supplies during at least a portion of their operation. This loading may cause the supply voltages to decrease, thereby disrupting the lower supply voltage for the deflection synchronizing waveform generator circuit below the minimum supply voltage at which it will operate.

Thus, after the receiver is first energized and before deflection system operation has occurred, the low voltage supply may rise to a sufficient amplitude to allow the deflection synchronizing waveform generator to begin operating. With the first cycle of deflection synchronizing waveform, a triggering signal for the deflection output stage occurs. As a result of the triggering of the deflection output stage, the high and low supply voltages are both reduced. If the low supply voltage is reduced below the minimum voltage at which the deflection synchronizing waveform generator will operate, deflection triggering will be interrupted until the low supply voltage again increases to the minimum amplitude at which the deflection synchronizing waveform generator will begin to operate.

It may be seen that the deflection system may go through several "on-off" cycles before normal continuous operation can be sustained. This "on-off" cycling of the deflection synchronizing waveform generator is undesirable because it is possible for the operation of the synchronizing waveform generator to be interrupted when the deflection output stage is in a highly conductive state. A blown fuse or open circuit breaker may result in the receiver power supply. In severe cases, component failure may occur. It would thus be desirable to prevent such interruption of the operation of the deflection synchronizing waveform generator.

SUMMARY OF THE INVENTION

A hysteresis power supply for a deflection system includes means for generating deflection synchronizing waveforms when direct current operating voltage supplied thereto exceeds a first amplitude, a source of direct current operating voltage including energy storage means chargeable from zero voltage to some nominal operating voltage after energization of the source, and a deflection current generator including switching means and a deflection winding coupled to the means for generating deflection synchronizing waveforms and to the direct current operating voltage source for deriving direct current operating voltage therefrom for switching in response to the deflection synchronizing waveforms for generating deflection current in the deflection winding.

Switching means are coupled to the source of direct current operating voltage and to the means for generating deflection synchronizing waveforms for switching from a first state to a second state for allowing direct current to flow from the source of direct current operating voltage to the means for generating deflection synchronizing waveforms and for remaining in the first state for inhibiting operation of the means for generating deflection synchronizing waveforms until direct current operating voltage supplied from the source to the means for generating deflection synchronizing waveforms exceeds a second amplitude substantially greater than the first amplitude for insuring that switching induced in the deflection current generator by operation of the means for generating deflection synchronizing waveforms does not reduce the direct current operating voltage supplied to the means for generating deflection synchronizing waveforms below the first amplitude.

The invention may best be understood by referring to the following description and the accompanying drawings of which:

Figures 1, 2, 3:
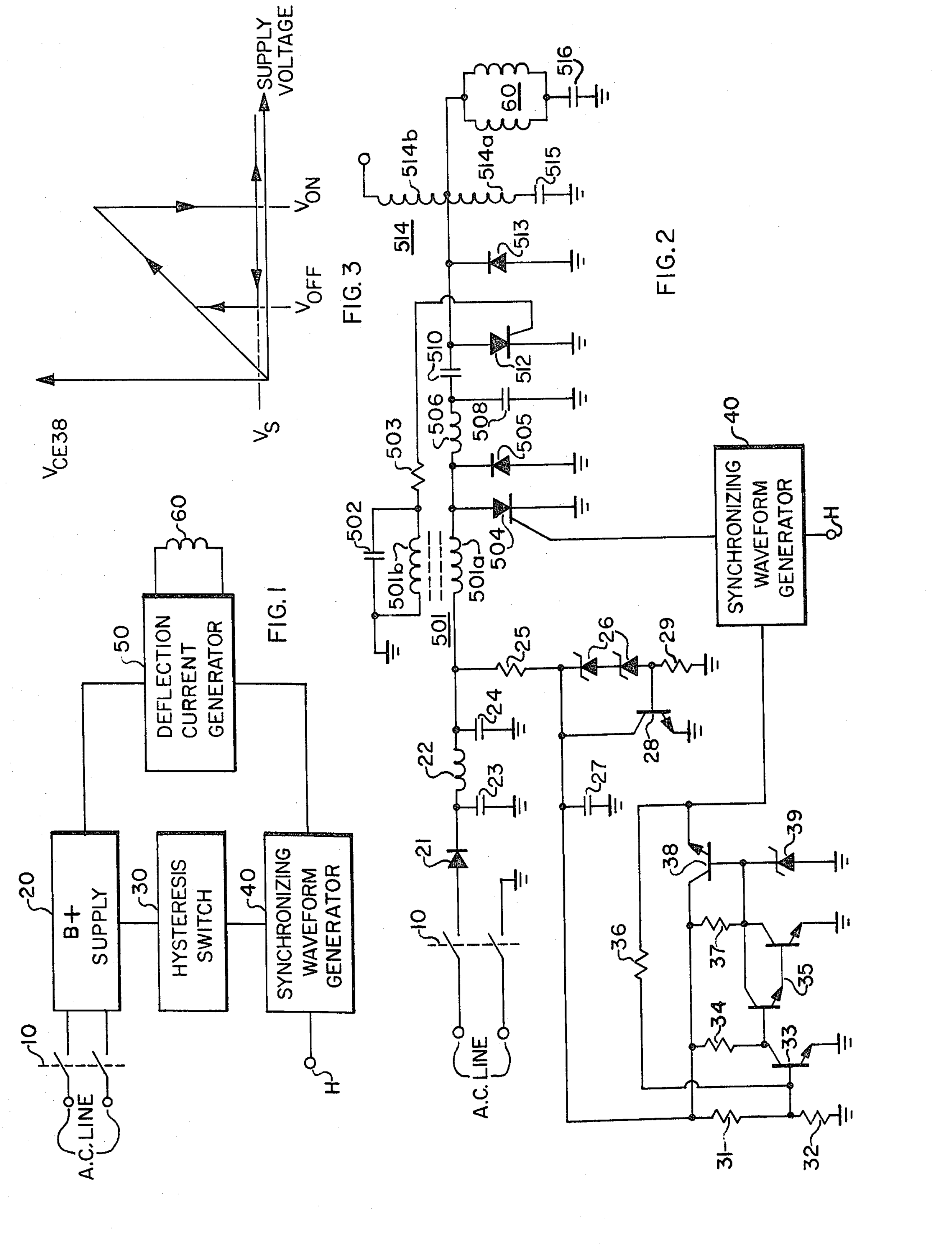
FIG. 1 illustrates a block diagram of a deflection system utilizing the present invention.
FIG. 2 illustrates a partly block and partly schematic diagram of a deflection system utilizing the present invention.
FIG. 3 illustrates a voltage characteristic of the present invention.

In FIG. 1, alternating current line voltage is coupled through an energizing switch 10 to a B+ direct current voltage supply 20 where the line voltage is rectified, filtered and stored in an energy storage capacitor for use as direct current operating voltage. Direct current operating voltage is coupled from B+ supply 20 to a horizontal deflection current generator 50 to which is coupled a deflection winding 60.

Direct current operating voltage is also coupled through a hysteresis power supply switch 30 to a horizontal deflection synchronizing waveform generator 40. Synchronizing waveform generator 40 generates waveforms suitable to trigger horizontal deflection current generator 50 to cause it to generate deflection current in winding 60 in synchronism with pulses coupled to a terminal H of synchronizing waveform generator 40. Direct current operating voltage must be supplied through switch 30 from B+ supply 20 before deflection synchronizing waveforms will be produced by deflection synchronizing waveform generator 40, however.

Triggering of horizontal deflection circuit 50 will cause loading of B+ supply 20 and a resulting decrease in the voltage supplied by B+ supply 20 to synchronizing waveform generator 40. It is therefore possible that when the voltage supplied by supply 20 first reaches an acceptable value for the operation of synchronizing waveform generator 40, waveform generator 40 will pass a triggering waveform to deflection current generator 50 causing it to generate deflection current in deflection winding 60 with a resultant decrease in the voltage available from B+ supply 20 due to the aforementioned loading. If the operating voltage supplied by B+ supply 20 to waveform generator 40 falls below the level at which waveform generator 40 becomes operative, waveform generator 40 will be disabled for one or more cycles of horizontal deflection, preventing the triggering of horizontal deflection generator 50 for one or more succeeding horizontal lines.

To prevent this cycling on and off by horizontal synchronizing waveform generator 40 by virtue of the decreasing B+ supply voltage, hysteresis switch 30 is inserted between B+ supply 20 and deflection synchronizing waveform generator 40.

The operation of hysteresis switch 30 may be understood by referring to FIG. 3, an illustration of a voltage switching characteristic of hysteresis switch 30.

As the rectified and filtered direct current B+ supply voltage across an energy storage capacitor in B+ supply 20 rises after switch 10 is closed, it reaches the voltage $V_{ON}$. $V_{ON}$ is sufficiently in excess of the voltage $V_{OFF}$, below which hysteresis switch 30 opens so that when waveform generator 40 triggers deflection generator 50 into operation, the voltage supplied by B+ supply 20 to waveform generator 40 will not fall below $V_{OFF}$ even though the operation of deflection generator 50 presents a substantial load to B+ supply 20. The voltage $V_{OFF}$ may be chosen equal to or greater than the minimum supply potential at which synchronizing waveform generator 40 will begin to operate.

As the voltage supplied by B+ supply 20 to hysteresis switch 30 reaches $V_{ON}$, then hysteresis switch 30 switches from the high impedance "off" state to the low impedance "on" state, allowing direct current to flow from B+ supply 20 to synchronizing waveform generator 40, causing it to begin to operate in the normal manner, providing triggering waveforms for deflection generator 50, generating deflection current in winding 60. In the "on" state, the voltage across hysteresis switch 30 is substantially decreased to $V_S$.

Should the direct current operating voltage available from B+ supply 20 for waveform generator 40 drop to $V_{OFF}$ for any reason (e.g., low alternating current line voltage or de-energization of the supply by opening switch 10), hysteresis switch 30 will return to its high impedance "off" state. The voltage across hysteresis switch 30 will then be substantially equal to the voltage available from B+ supply 20. No direct current will flow through switch 30 to operate deflection waveform generator 40. Hence, no triggering waveforms will be supplied to horizontal deflection generator 50 and deflection current will cease to flow in deflection winding 60. Hysteresis switch 30 will then remain off until the voltage across it reaches $V_{ON}$, at which time it will again switch to its low impedance "on" state, providing direct current operating potential to deflection waveform generator 40 and initiating normal operation of the deflection system.

FIG. 2 illustrates a block and schematic circuit embodiment of a deflection system utilizing the present invention.

Switch 10 is closed to couple the alternating current line voltage to a rectifying and filtering circuit comprising rectifier 21 and filter capacitor 23, filter choke 22 and storage capacitor 24. Direct current operating voltage stored in capacitor 24 is supplied to a dual bidirectional switch horizontal deflection generator of a type described in U.S. Pat. No. 3,452,244 issued to W. Dietz and entitled, "Electron Beam Deflection and High Voltage Generation Circuit." The horizontal deflection generator includes a winding 501*a* of an input choke 501 and a bidirectional commutating switch comprising an SCR 504 and a diode 505 in antiparallel relation. A commutating inductor 506 is coupled to the commutating switch and to commutating and auxiliary capacitors 510 and 508, respectively. A bidirectional trace switch comprising an SCR 512 and a diode 513 in antiparallel relation is coupled to commutating capacitor 510. A horizontal output transformer primary winding 514*a* and series blocking capacitor 515 and a pair of parallel-coupled horizontal deflection windings 60 coupled in series with a blocking and S-shaping capacitor 516 are coupled in parallel with the trace switch. A high voltage secondary winding 514*b* is coupled to winding 514*a*. A triggering circuit coupled to the gate of trace SCR 512 comprises capacitor 502 and resistor 503. Triggering signal is supplied by a secondary winding 501*b* of input reactor transformer 501. The triggering signal coupled to the gate of commutating SCR 504 is supplied from synchronizing waveform generator 40.

Rectified and filtered direct current operating voltage stored in capacitor 24 is supplied through a voltage dropping resistor 25 to a lower voltage filter and storage capacitor 27 which is coupled in parallel with a shunt regulator transistor 28. The base current of transistor 28 is controlled by a pair of zener diodes 26 and a resistor 29.

A voltage divider comprising a resistor 31 and a resistor 32 is also coupled across capacitor 27. The collector of a transistor 33 is coupled through a load resistor 34 to the ungrounded terminal of capacitor 27. The base of transistor 33 is coupled to the junction of resistors 31 and 32 and the emitter of transistor 33 is coupled to ground.

The collector of transistor 33 is also coupled to the base of a first transistor of a high-gain Darlington configuration comprising a pair of transistors 35. The emitter of the first transistor of the Darlington pair is coupled to the base of the second. The collectors of transistors 35 are joined and coupled through a load resistor 37 to the ungrounded terminal of capacitor 27. The emitter of the second transistor of Darlington pair 35 is grounded. The joined collectors of the Darlington pair are coupled to the cathode of a zener diode 39, the anode of which is grounded.

The collector of a series pass transistor 38 is also coupled to the ungrounded terminal of capacitor 27. The base of transistor 38 is coupled to the cathode of zener diode 39. The emitter of transistor 38 is coupled to synchronizing waveform generator 40 for supplying direct current operating voltage thereto. Positive feedback is achieved by coupling a resistor 36 between the emitter of transistor 38 and the base of transistor 33.

When switch 10 of FIG. 2 is closed, alternating current voltage is halfwave rectified by diode 21. The voltage is then filtered by capacitor 23 and inductor 22 and stored as direct current supply voltage in capacitor 24. Direct current operating voltage is supplied from capacitor 24 to the horizontal deflection system through winding 501*a*.

The dual bidirectional switch deflection system is explained in detail in the aforementioned U.S. Pat. No. 3,452,244 issued to W. Dietz, but is briefly outlined here to aid in understanding the present invention. At the beginning of the horizontal deflection trace interval, trace diode 513 is forward biased by virtue of energy stored in deflection windings 60 and horizontal output transformer 514 at the end of the preceding deflection retrace interval. During the first half of the trace interval, diode 513 conducts an approximately linearly decreasing current as this energy is recovered. Capacitors 515 and 516 charge as this current flows.

A triggering pulse provided by winding 501b and shaped by capacitor 502 and resistor 503 places trace SCR 512 in condition for conduction. At the middle of the trace interval, SCR 512 begins to conduct and conducts a linearly increasing current to discharge capacitors 515 and 516 during the second half of the trace interval.

Toward the end of the trace interval, a triggering waveform supplied by horizontal synchronizing waveform generator 40 places commutating SCR 504 in condition for conduction. It begins to conduct effectively coupling power supply capacitor 24 to ground through input winding 501*a*. Similarly, capacitors 508 and 510 which have been previously charged are coupled to ground through commutating inductor 506. Capacitors 24, 508 and 510 begin to discharge through SCR 504.

The discharging of capacitors 508 and 510 first reverse biases SCR 512 causing it to become nonconductive. The discharging of capacitor 24 will cause a decrease in the voltage established thereacross. Energy stored in inductor 506 will cause capacitors 508 and 510 to charge in the opposite direction, reverse biasing trace diode 513 and tending to reverse the flow of current in deflection windings 60 and horizontal output transformer primary winding 514a.

The voltage flyback pulse appearing at the junction of SCR 512, diode 513, horizontal output transformer winding 514*a* and deflection windings 60 begins to increase. The flyback pulse first rises as windings 514*a* and 60 ring for a half cycle with the circuit capacitance including capacitors 508 and 510. Then as capacitors 508 and 510 discharge back through windings 514*a* and 60, reversing the flow of current in these windings and adding energy to them, capacitors 515 and 516 begin to charge. Diode 505 conducts, aiding the discharging of capacitors 508 and 510, which then charge in the opposite direction. The circuit is then in proper condition to begin the next deflection trace interval.

Since it may be desirable to trigger the deflection system, and specifically SCR 504, from an integrated circuit synchronizing waveform generator 40, a low direct current operating voltage source is required to reduce power dissipation on the integrated circuit chip. Voltage dropping resistor 25 is thus provided. Resistor 25 also aids to decouple the integrated circuit supply across filter capacitor 27 from supply capacitor 24. A shunt regulator comprising transistor 28, zener diodes 26 and resistor 29 controls the voltage across capacitor 27 at the sum of the reverse voltage drops of zener diodes 26 plus the base-emitter voltage drop of transistor 28.

If for some reason commutating SCR 504 should fail to be sufficiently reverse biased to turn off during operation of the deflection system, the voltage supply across capcitor 24 will be coupled to ground through inductor 501*a*. For example, if the deflection system is started too quickly after switch 10 is closed, a drain on the voltage supply established across capacitor 24 will result. Substantial discharging of capacitor 27 may also result and the power supply for synchronizing waveform generator 40 may thus be disrupted. Disruption of the supply voltage established across capacitor 27 may cause synchronizing waveform generator 40 to go through one or more "on-off" cycles after closing switch 10 before sufficient voltage is provided across capacitors 24 and 27 to insure normal operation of synchronizing waveform generator 40 and of the horizontal deflection current generator.

To prevent this "on-off" cycling resulting from the operation of the horizontal deflection system in response to synchronizing waveforms coupled from synchronizing waveform generator 40, hysteresis switch 30 comprising elements 31 and 39 is added. Hysteresis switch 30 delays the beginning of operation of synchronizing waveform generator 40 by preventing direct current operating voltage from being supplied to synchronizing waveform generator 40 until the voltage across capacitor 27 reaches voltage $V_{ON}$ of FIG. 3. This delaying of supply voltage insures that when commutating SCR 504 is triggered "on" causing a relatively heavy current drain from capacitor 27, the supply voltage across capacitor 27 will not be reduced below $V_{OFF}$ of FIG. 3.

To achieve hysteresis switching, transistor 33 monitors the voltage across resistor 32 of the resistor 31-resistor 32 voltage divider. As long as the base current of transistor 33 is sufficiently low, current through resistor 34 allows the high gain configuration 35 to conduct. The high gain of Darlington pair 35 insures that the collector voltage of the Darlington pair will be insufficient to render series pass transistor 38 conductive.

However, when the voltage across capacitor 27 rises to $V_{ON}$ of FIG. 3, conduction of transistor 33 due to its increased base current insures that the collector voltage of Darlington pair 35 will be sufficient to allow series pass transistor 38 to be rendered conductive. Positive feedback from the emitter of transistor 38 through resistor 36 then increases the rate at which transistor 38 is rendered conductive by increasing the base drive current of transistor 33 as transistor 38 becomes more conductive. Transistor 38 is thus quickly driven into a highly conductive state in which it exhibits only the low collector-emitter voltage drop $V_S$ of FIG. 3. Thus, once $V_{ON}$ appears across capacitor 27, approximately the full potential across capacitor 27 will be supplied to synchronizing waveform generator 40, allowing it to begin operating to synchronize the operation of the deflection system.

The positive feedback through resistor 36 of the switch also allows the system to remain conductive against decreases in the voltage appearing across capacitor 27 as long as that voltage remains greater than $V_{OFF}$. The selection of resistors 31, 32 and 36 is such as to allow transistor 38 to remain in a highly conductive state with relatively low potential drop across its collector-emitter terminals until the voltage across capacitor 27 decreases to $V_{OFF}$. When the voltage across capacitor 27 reaches $V_{OFF}$, transistor 38 quickly switches to the high impedance state removing direct current operating voltage from synchronizing waveform generator 40. Normal operation of the deflection system thus ceases until the voltage across capacitor 27 again rises to $V_{ON}$.

It should be noted that all of components 26 through 39, with the exception of capacitor 27, may be placed on an integrated circuit chip along with many of the devices and components which may be used in deflection synchronizing waveform generator 40.

What is claimed is:

1. A hysteresis power supply for a deflection system, comprising:

means for generating deflection synchronizing waveforms when direct current operating voltage supplied thereto exceeds a first amplitude;

a source of direct current operating voltage including energy storage means chargeable from zero voltage to some nominal operating voltage after energization of said source;

a deflection current generator including switching means and a deflection winding coupled to said means for generating deflection synchronizing waveforms and to said source of direct current operating voltage for deriving direct current operating voltage therefrom for switching in response to said deflection synchronizing waveforms for generating deflection current in said deflection winding; and switching means coupled to said source of direct current operating voltage and to said means for generating deflection synchronizing waveforms for switching from a first state to a second state for allowing direct current to flow from said source of direct current operating voltage to said means for generating deflection synchronizing waveforms and for remaining in said first state for inhibiting operation of said means for generating deflection synchronizing waveforms until direct current operating voltage supplied from said source to said means for generating deflection synchronizing waveforms exceeds a second amplitude substantially greater than the first amplitude for insuring that said switching induced in said deflection current generator by operation of said means for generating deflection synchronizing waveforms does not reduce said direct current operating voltage supplied to said means for generating deflection synchronizing waveforms below said first amplitude.

2. A hysteresis power supply according to claim 1 wherein said switching means includes a transistor having a control electrode coupled to means for sensing said voltage across said energy storage means and having its main current conducting path coupled to said source of direct current operating voltage and to said means for generating deflection synchronizing waveforms for being responsive to said control electrode voltage for coupling siad direct current operating voltage to said means for generating deflection synchronizing waveforms.

3. A hysteresis power supply according to claim 2 wherein feedback means are provided from the main current conducting path of said transistor to said sensing means for insuring that said switching means remains in said second state until said direct current operating voltage is reduced to said first amplitude.

4. A hysteresis power supply according to claim 2 wherein said means for sensing said voltage across said energy storage means are coupled through active current conducting means to said control electrode of said transistor.

* * * * *